Dec. 5, 1967  G. C. ROBINSON, JR., ET AL  3,356,276
EXTRUDED COMPOSITE CONDUCTOR RAILS

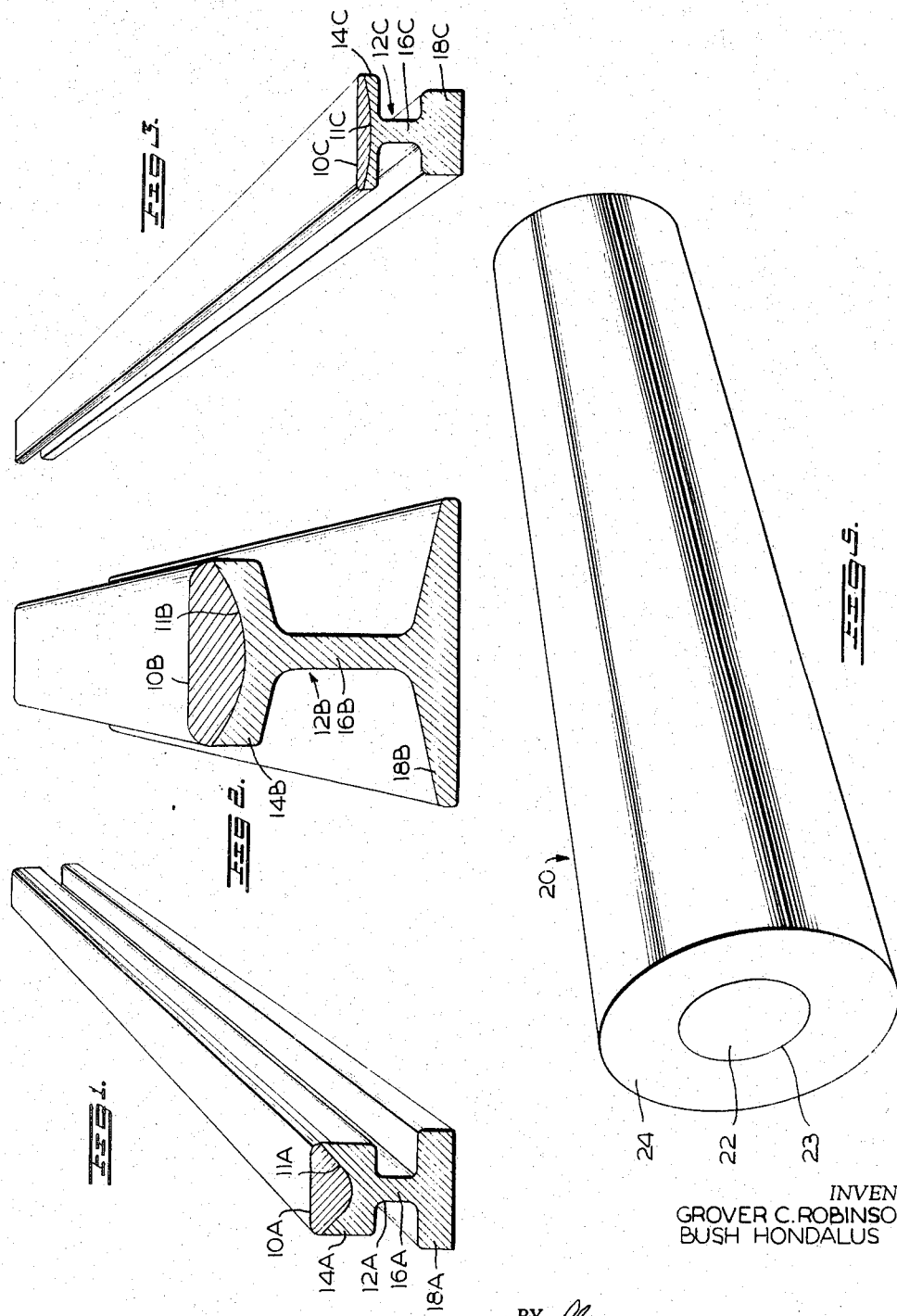

Filed March 8, 1965  4 Sheets-Sheet 2

INVENTORS
GROVER C. ROBINSON, JR.
BUSH HONDALUS

BY Glenn, Palmer & Matthews
ATTORNEYS

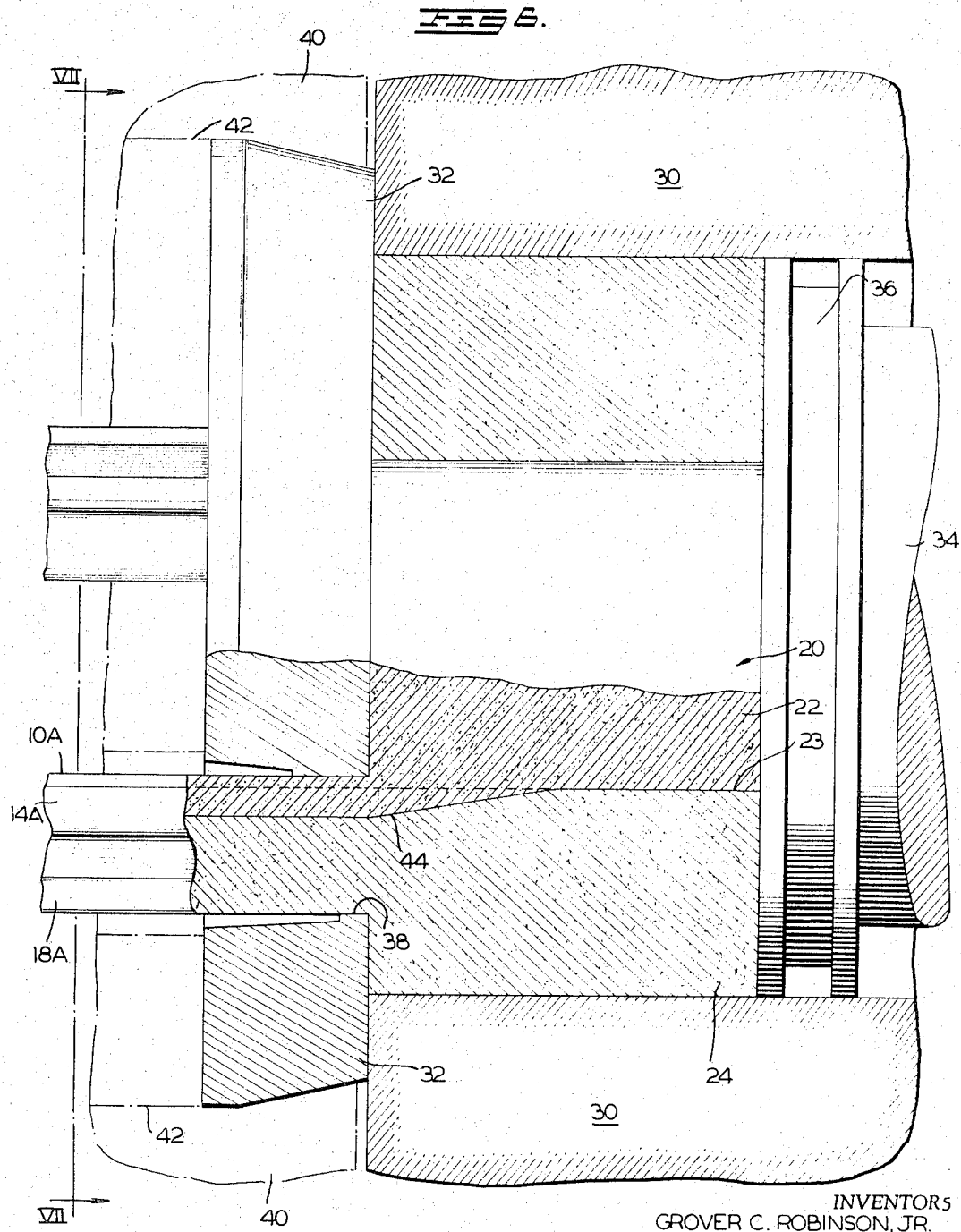

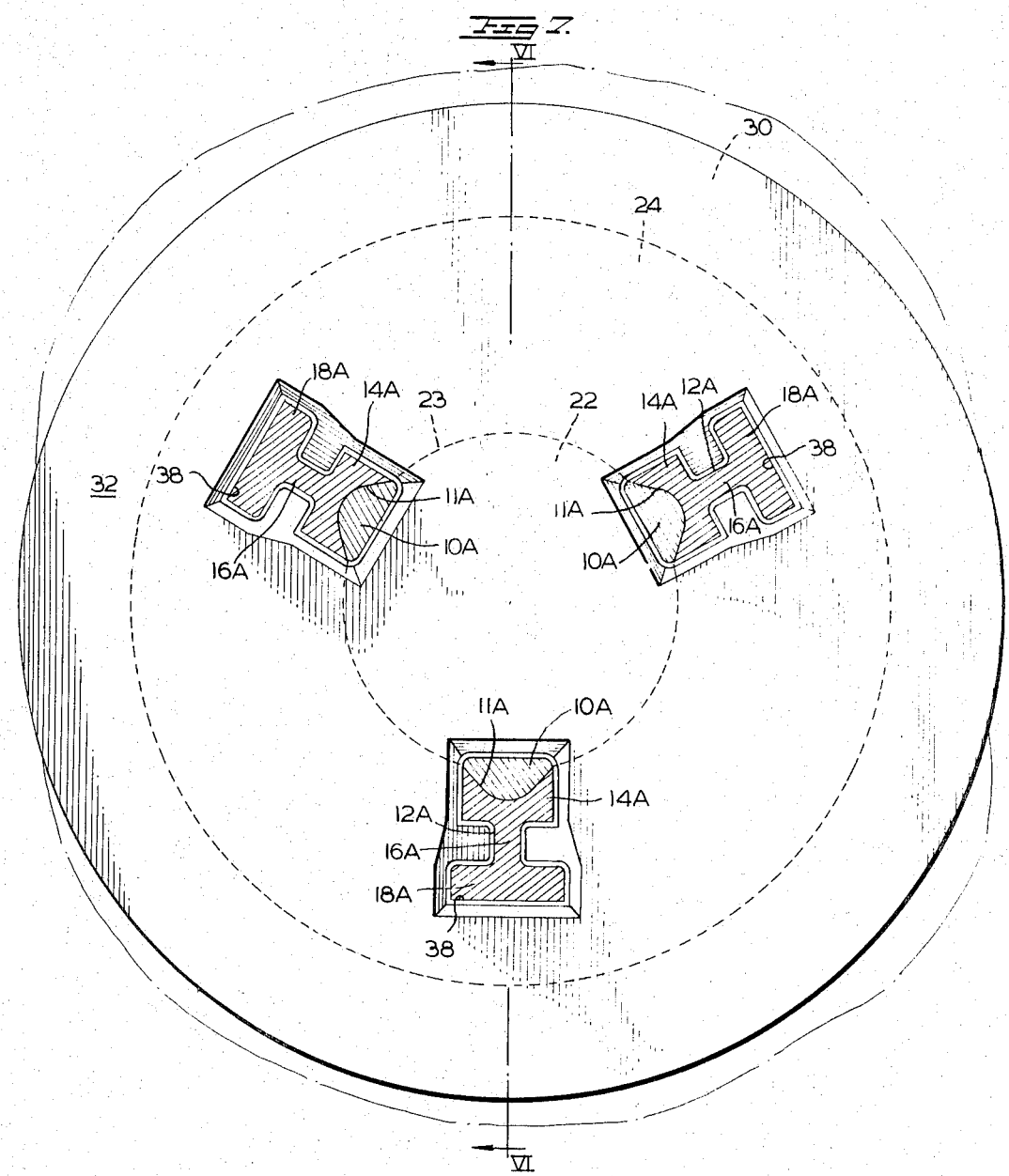

United States Patent Office 3,356,276
Patented Dec. 5, 1967

3,356,276
EXTRUDED COMPOSITE CONDUCTOR RAILS
Grover C. Robinson, Jr., Richmond, and Bush Hondalus, Chesterfield County, Va., assignors to Reynolds Metals Company, Richmond, Va., a corporation of Delaware
Filed Mar. 8, 1965, Ser. No. 437,687
12 Claims. (Cl. 238—150)

This invention relates to composite conductor rails.

For many years rail transportation has been the backbone of the internal transportation systems of most industrialized countries. More recently, electric railways particularly have become well established as a means of transportation, and electric transportation systems will be heavily relied upon to meet future passenger and freight requirements.

Electric power has a number of advantages over diesel and steam power in the transportation field. The power generating equipment and fuel remain stationary in large and efficient central stations instead of being carried with the vehicle and its payload. Electric motors are inherently simpler than diesel or steam engines and accordingly are more dependable, have a longer operating life, and require less maintenance and down time. Electric-powered vehicles have a much lower weight per unit horsepower, enabling them to have large reserves of overload capacity for accelerating rapidly and smoothly to high speeds, an essential to efficient urban and suburban passenger transportation. Such locomotives also are superior in their ability to operate at high speeds for sustained periods. Flexibility is another characteristic of electric-powered vehicles: the compactness of electric motors enables them to be used efficiently in passenger vehicles of optimum size, while on the other hand multiple units of locomotives or passenger cars can be coupled and conveniently controlled by one operator when additional power is required. Electric motors have no exhaust and are relatively quiet, enabling them to be used underground without elaborate ventilation and near densely populated areas. Electric-powered vehicles require no refueling. Electric motors can be instantly converted to generators for braking in order to save brakes and generate electrical power which may be fed back into the generating system. In addition, if electrical power is available at reasonable rates, costs of operating electric transportation systems are relatively low. Those skilled in the art no doubt will be aware of other advantages of electric-powered vehicles.

The primary disadvantage of electric railways is the relatively high initial investment required for transmission lines, conductors, central generating stations, substations, and the like. Accordingly in the past electric railways have been found most suitable only where rail traffic is relatively dense.

It is expected that electric transportation systems, and especially electric rapid-transit systems, must be increasingly relied upon in the future, as existing transportation systems will be inadequate to meet the requirements of the population in expanding urban and suburban areas. It has been estimated, for example, that one railway track can do the passenger-carrying work of 18 lanes of highway. Also, electric transportation systems will ease the drain on fossil fuel resources by using electric power generated from nuclear sources, which power is already competitive in a number of geographical areas.

Electrically conducting rails have been made of steel in many existing electric railways. Even when a special type of "conductivity steel" (actually almost pure iron) is used, however, the electrical conductivity is discouragingly low; for example, one particular fourth rail electrical transportation system requires, for current conduction alone, about 173 tons of steel for every mile of single track. On the other hand, materials having high electrical conductivity, such as aluminum, certain aluminum alloys, and copper, are not sufficiently abrasion-resistant to withstand repeated sliding contact with the current collector. While composite rails having tread portions more abrasion-resistant than their base portions have been proposed for purposes of economy or improved electrical conductivity, such rails have not been satisfactory, because, among other reasons, they have employed inadequate bonds, incompatible materials, or materials which, even when considered separately, have inadequate electrical conductivities.

It is the object of this invention to provide a novel electrically conducting rail which can be used advantageously in either existing or future electric transportation systems, thereby to fulfill a long-standing and hitherto unsatisfied need of the art.

Primary advantages of the invention are the rail's high electrical conductivity and low density. For example, a typical such rail has at 20° C. an average longitudinal electrical conductivity of about 50% to 56% IACS (International Annealed Copper Standard, based on equal volume) and a specific gravity of about 2.70. In comparison, 99.98% pure iron has at 20° C. an electrical conductivity of less than 18% IACS and a specific gravity of over 7.80. Thus a rail according to the invention weighs less than one-eighth as much as a conventional "conductivity steel" rail of the same conductance. These advantages can be realized in a number of different ways. The voltage drop along the rails may be decreased, resulting in an operational cost saving because less power is consumed. Central generating stations and substations may be spaced farther apart in the system or their capacity reduced. Feeder lines may be used less frequently or eliminated. When overhead conductor rails are used or when conducting rails must be otherwise supported, their supports may be made lighter or spaced farther apart. Rails may be made lighter per unit length to reduce their initial cost and costs of shipping and installing them. In addition, these considerations will afford those skilled in the art more flexibility in designing electrical transportation systems with respect to selection of A.C. or D.C. components such as transmission lines, transformers, rectifiers, motors, and the like, as well as in the selection of the operating conditions therefor.

Another primary advantage of the invention is that the rail achieves the foregoing while having an extremely hard and wear-resistant surface or tread portion.

Another advantage of the invention is that, although the rail comprises a tread portion and an adjoining portion of different materials, their coefficients of thermal expansion are sufficiently close that the composite rail exhibits favorable thermal expansion and contraction characteristics.

Another advantage of the invention is that, although the rail comprises the two different materials, an intimate bond between them is sufficiently strong that the composite rail may be considered unitary in its ability to meet demands substantially more rigorous than those which will be placed upon it.

Another advantage of the invention is that, although the rail comprises the two different materials, their electrochemical potentials are sufficiently close that the composite rail is favorably resistant to electrolytic corrosion.

Another advantage of the invention is that the portion adjoining the tread portion is relatively ductile, enabling the composite rail better to withstand deformation.

Another advantage of the invention is that the relative softness of the portion adjoining the tread portion enables certain types of rail bonds to be inserted conveniently thereinto in order to electrically connect adjacent rail sections.

Another advantage of the invention is that the rail is non-magnetic and when used in A.C. power systems therefore eliminates certain of the voltage losses which would otherwise result from the inductive reactance caused by steel conductor rails.

Another advantage of the invention is that when used in A.C. power systems the rail further eliminates certain of the hysteresis and eddy current power losses which would otherwise be caused by steel conductor rails.

Still another advantage of the invention is that the rail favorably resists the deleterious effects of weathering, while at the same time achieving these other advantages.

A further advantage of the invention is that the rail has a relatively high resistance to mechanical shock, while at the same time achieving these other advantages.

A further advantage of the invention is that the rail may be produced conveniently by extrusion.

A still further advantage of the invention is that a composite billet may be extruded by a single extrusion into the finished rail.

Yet another advantage of the invention is that a plurality of rails, as well as of other composite articles, can conveniently be extruded simultaneously.

The electric transportation systems with which this invention is concerned need not employ vehicles riding on load-carrying rails or having flanged wheels, but may also use vehicles supported or guided by other means; e.g., vehicles supported by overhead rails or a monorail, vehicles mounted on rubber tires, or vehicles in an overhead crane system. The conductor rails of this invention can of course be used as a third, fourth, or fifth rail, and can carry either alternating or direct current at any suitable location in the system circuit. Such conductor rails could be mounted on the surface, underground, or overhead for top-, side-, or under-contact with the current collector, or in any other suitable arrangement.

For a better understanding of the invention and of its other details, objects, and advantages, reference is now made to the accompanying drawings, which show, for purposes of illustration only, present preferred embodiments of the invention. In the drawings:

FIGURE 1 is a perspective view in vertical section of an A.C. rail according to the invention;

FIGURE 2 is a perspective view in vertical section of a D.C. rail according to the invention;

FIGURE 3 is a perspective view in vertical section of an A.C. rail according to the invention adapted to be mounted in a construction of the Pennsylvania top-contact type used for yards;

FIGURE 5 is a perspective view of a billet which can be extruded into rails according to the invention;

FIGURE 6 is a plan view partly in section along VI–VI in FIGURE 7 of a portion of an extrusion press extruding a composite billet into composite rails according to the invention; and FIGURE 7 is a front view partly in section along VII–VII in FIGURE 6.

Figure 4:
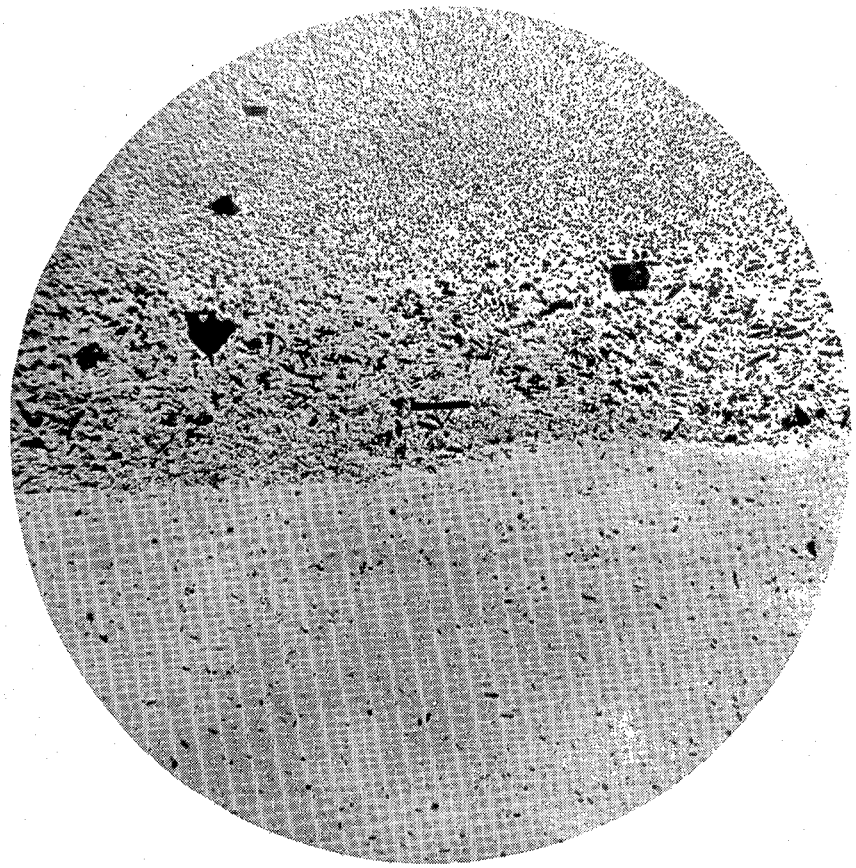
FIGURE 4 is an enlarged photomicrograph of 100× magnification of an etched cross-section of a rail according to the invention showing the interface between the tread portion and the adjoining portion.

Referring now more particularly to the drawings, FIGURES 1, 2, and 3 each show, with their reference characters respectively bearing the suffixes "A", "B", and "C", a composite extruded conductor rail having a contact surface or tread 10 bonded at interface 11 to a remaining portion 12 comprising head 14, web 16, and base 18. A collector (e.g., an under- or over-running shoe, a bow, or a plow) connected by suitable electrical means to the locomotive motor rides in contact with the tread 10, for example, being urged thereagainst by suitable resilient means, as is commonly known in the art. The material of tread 10 is harder and more abrasion-resistant than the material of the remaining portion 12. A hyper-eutectic aluminum-silicon alloy, the wear resistance of which compares favorably with that of steel, has been found most suitable as the tread material. (The eutectic point is 11.6% silicon.) The presently preferred proportions are about 83 percent aluminum and about 17 percent silicon; decreasing the silicon content will cause the alloy to be softer and hence less abrasion-resistant while increasing the silicon content substantially will make the alloy more difficult to cast and extrude. The alloy may also contain minor additions of other elements, such as copper, iron, or magnesium.

The A.C. rail shown to scale in FIGURE 1 has an overall height of 1.718 inches and a head width of 1.125 inches. The somewhat larger D.C. rail shown to scale in FIGURE 2 has an overall height of 3.250 inches and a head width of 2.250 inches. The A.C. rail shown to scale in FIGURE 3, which is adapted to be mounted in a construction of the Pennsylvania top-contact type used for yards, has an overall height of 1.250 inches and a head width of 1.375 inches. Of course, a given rail according to the invention may carry either alternating or direct current and may have any suitable cross-sectional shape, tread location, and dimensions.

The material for the remaining portion 12 is selected primarily for its electrical conductivity. Presently preferred is 6101 aluminum-magnesium-silicon alloy, which in T6 temper at 20° C. has an electrical conductivity of about 57% IACS, or 187% of copper, based on weight. 6063 aluminum-magnesium-silicon alloy, which in T6 temper at 20° C. has an electrical conductivity of about 53% IACS, or 175% of copper, based on weight, also may be used. Although less electrically conductive than 6101 alloy, 6063 alloy has slightly superior mechanical properties. Other aluminum alloys having suitable electrical conductivities also can be used. Although the electrical conductivity of tread 10 is inferior to that of the remaining portion 12, tread 10 is sufficiently thin, its electrical conductivity sufficiently high, and the bond at interface 11 between it and the remaining portion 12 sufficiently complete, that the voltage drop across it is slight. On the other hand, the much greater problem in the art, longitudinal voltage drop along the rail, is greatly alleviated by the high electrical conductivity of the remaining portion 12. Accordingly the average electrical conductivity of a typical composite rail according to the invention will be between about 50% and 56% IACS.

FIGURE 4, an enlarged 100× photomicrograph of an etched rail cross-section, shows that the hyper-eutectic aluminum-silicon alloy tread 10 is intimately bonded to the remaining portion 12, which in this instance is 6063 aluminum alloy. Without being bound by a present understanding of the invention, it is believed that the bond results from the interrelated phenomena of pressure welding and diffusion, and accordingly can be characterized as a "metallurgical" bond.

FIGURE 5 shows a composite billet 20 comprising cylindrical inner ingot 22 of material for tread 10 and annular outer ingot 24 of material for the remaining portion 12 of the rail. Their sizes are determined by selecting the outside diameter of outer ingot 24 to provide a close fit with the container of the extrusion press and providing that the cross-sectional areas of inner ingot 22 and outer ingot 24 are in substantially the same proportion as the desired cross-sectional areas of tread 10 and the remaining portion 12. For example, the desired average thickness of the tread 10A of the A.C. rail shown in FIG. 1 is 0.282 inch. Thus it can be determined from the other desired rail dimensions that the desired cross-sectional areas of tread 10 and remaining portion 12 are 0.317 square inch and 1.32 square inches, respectively. If the container has an inner diameter of about 9 inches, then the outer ingot 24 outer diameter will be slightly less than 9 inches, and the inner diameter of outer ingot 24 (and the outer diameter of inner ingot 22) will be about 3.96 inches. The composite billet 20 may be formed by first casting inner ingot 22, allowing it to cool and solidify, then casting outer ingot 24 around inner ingot 22, and in turn allowing it to cool and solidify. Alternatively, the two ingots could be continuously cast in the same operation, for example, as disclosed in copending and co-assigned U.S. application Ser. No. 218,205, now Patent No. 3,206,808. Outer ingot 24, which usually will have a higher coefficient of thermal expansion than inner ingot 22, may separate therefrom upon cooling; however, this has not presented any problems, since extruding forms a strong, metallurgical bond between the two and any oxide at the interface is apparently so greatly dispersed during extruding as to be inconsequential. In fact, a certain amount of oxide at the interface may even be beneficial.

There are two reasons for making inner ingot 22, rather than outer ingot 24, of the metal for the tread 10: (1) the material occupying the smaller volume should be placed at the center of the billet so that its thickness can be greater, thereby promoting more uniform flow of the metal during extrusion; (2) when the harder metal is at the center of the billet, the surrounding softer metal acts as a lubricant between it and the steel container of the extrusion press, thereby making possible greater extrusion rates without attendant surface damage.

For a description of the method of extruding, in accordance with the invention, composite articles, such as conductor rails, reference is now made to FIGURES 6 and 7. In the extrusion press, electrically heated container 30 is urged against the face of die 32, which is restrained by conventional die holder 40 and die backup 42. After pre-heated billet 20 and dummy block 36 are elevated by a suitable mechanism (not shown) into alignment with container 30, ram 34 moves forward (to the left in FIGURE 6) to push billet 20 and dummy block 36 into container 30. Ram 34 continues to move forward, crushing billet 20 against die 32 and container 30. Billet 20 is now positioned so that interface 23 between inner ingot 22 and outer ingot 24 is exposed to three symmetrically located die openings 38. Each opening 38 has a bearing surface identical to the desired cross-section of the extruded rail, and is intersected by interface 23 at substantially the same location as the desired interface 11A between tread 10A and remaining portion 12A in the finished rail. Continuing to move forward, ram 34 and dummy block 36 extrude billet 20 through the bearing surfaces of the die openings 38 simultaneously to form three rails, each like the rail shown in FIGURE 1. Rail interface 11A corresponds generally to billet interface 23, but has a greater curvature by virtue of an outward bulging toward the rail centerline. Accordingly billet 20 is shown schematically to deform at 44. The shape of the interface may vary considerably from that shown in the drawings, however. The emerging rails are preferably heat treated by suitable processes involving press-quenching, for example, as disclosed in U.S. Patent 3,019,144, to achieve a T-6 temper. Alternatively, the rails may be heat treated in subsequent heating and quenching operations, or may simply be used in the as-extruded condition.

Actual examples of the invention will now be described.

*Example 1*

An inner ingot of an aluminum alloy consisting essentially of 17% silicon with balance substantially aluminum was cast in the form of a cylinder 3 inches in diameter and 27 inches long, and allowed to cool. An outer ingot of 6063 aluminum alloy having a thickness of 2½ inches was then cast about the peripheral surface of the inner ingot and also allowed to cool. Thus the composite billet had an overall diameter of 8 inches and an overall length of 27 inches. Six of such billets were sequentially pre-heated in a gas-fired furnace to a temperature of 900° F., dip-quenched to a temperature of 700° F., and then extruded, in accordance with the process described above, by a 2300 ton, horizontal, self-contained, oil-driven, extrusion press at a ram speed of about 12 inches per minute through a four-hole die. The four resulting rails emerged at a speed of 102 inches per minute. The rails, which were similar to that shown in FIGURE 3, exhibited good metal placement, excellent surface condition, excellent straightness, and an intimate metallurgical bond between the two different materials. Subsequent tensile tests performed upon a typical one of the rails in the as-extruded condition indicated the following mechanical properties: yield strength—13,200 p.s.i., ultimate strength—18,700 p.s.i.; and elongation to ultimate failure (in 2 inches)—26%. In addition, typical such rails in the as-extruded condition successfully passed short-circuit tests and initial abrasion tests.

*Example 2*

An inner ingot of an aluminum alloy consisting essentially of 17% silicon with balance substantially aluminum was cast in the form of a cylinder 4 inches in diameter and 27 inches long, and allowed to cool. An outer ingot of 6101 aluminum alloy having a thickness of 2½ inches was then cast about the peripheral surface of the inner ingot and also allowed to cool. Thus the composite billet had an overall diameter of 9 inches and an overall length of 27 inches. Twenty-five of such billets were sequentially pre-heated in a gas-fired furnace to a temperature of 900° F., inserted into the container pre-heated to a temperature of 800° F., and extruded, in accordance with the process described above, by a 2300 ton, horizontal, self-contained, oil-driven, extrusion press at a ram speed of 20 inches per minute through a three-hole die similar to that shown in FIGURES 6 and 7. An inspection of the resulting rails, which were similar to those shown in FIGURE 1, indicated excellent metal placement, surface condition, and straightness, and an intimate metallurgical bond between the two different materials.

Of course, the number of rails which are extruded simultaneously can be varied by disposing a different number of die openings symmetrically about the die axis. Increasing the number of rails will decrease the lengths of the rails which can be produced from a given billet in a single extrusion, while decreasing the number may require a larger press capacity.

It will be noted that the use of a cylindrical inner ingot results in a curved interface and a tread of non-uniform depth across its width. Although slightly decreasing the overall conductivity of the rail by requiring an excess of the tread alloy, the curvature of the interface provides additional surface area for an improved bond and reduces the susceptibility of the bond to shearing forces. If this is objectionable, however, the inner ingot may be provided with a polygonal cross-section and oriented by rotation prior to each extrusion so that its respective sides are parallel to the corresponding portions of the die openings which form the tread surfaces. Obviously, the interface can be similarly made to have other desired shapes.

Although the method according to the invention has been described with reference to producing composite conductor rails, this method may be used to produce other composite articles. There are numerous applications requiring combinations of properties not conveniently found in a single metallic substance. For example, an automobile bumper desirably should be economically produced and should have high strength and a bright finish on its outer surface. Consequently a plurality of bumpers each having a relatively weak, expensive, and bright outer surface of, for example, high purity (99.5% or greater) aluminum, intimately bonded to a relatively strong, cheap, and dull backing of, for example, 5083, 7002, or 7079 aluminum alloy, may be extruded simultaneously in accordance with the inventive method. Structural members which are both functional and decorative may be produced similarly.

As used herein, the term "aluminous metal" is intended to mean aluminum and alloys containing more than 50% aluminum.

While present preferred embodiments of the invention have been illustrated and described, it will be understood that the invention may be otherwise variously embodied and practiced within the scope of the following claims.

What is claimed is:

1. An integral, extruded conductor rail comprising an aluminum alloy tread portion intimately extrusion-bonded to an adjoining portion, said tread portion being more abrasion-resistant than, though having a lower electrical conductivity than, said adjoining portion.

2. An integral, extruded conductor rail comprising: a tread portion of an aluminum alloy containing at least 11.6% silicon, and an adjoining portion of a different aluminous metal intimately extrusion-bonded thereto, said tread portion, though having a lower electrical conductivity than said adjoining portion, being substantially more abrasion-resistant than said adjoining portion.

3. An integral, extruded conductor rail having at 20° C. an average longitudinal electrical conductivity of at least 50% IACS and comprising: a tread portion of a first aluminum alloy containing at least 11.6% silicon, and head, web, and base portions of a second aluminum alloy; said tread portion having one relatively large surface metallurgically bonded by extrusion to said head portion and an opposite surface exposed for contact with a current collector; said tread portion being substantially more abrasion-resistant than said head, web, and base portions; said head, web, and base portions having a substantially higher electrical conductivity than said tread portion; and the cross-sectional area of said tread portion being substantially less than the combined cross-sectional areas of said head, web, and base portions.

4. The article according to claim 3 wherein said second alloy consists essentially of aluminum, magnesium and silicon.

5. An integral, extruded conductor rail comprising an aluminum alloy tread portion intimately bonded to an adjoining portion, said tread portion being more abrasion-resistant than, though having a lower electrical conductivity than, said adjoining portion, and said alloy containing at least 11.6% silicon.

6. The article according to claim 5, wherein said adjoining portion is an alloy consisting essentially of aluminum, magnesium, and silicon.

7. An integral, extruded conductor rail comprising an aluminum alloy tread portion intimately bonded to an adjoining portion, said tread portion being more abrasion-resistant than, though having a lower electrical conductivity than, said adjoining portion, and said alloy containing about 17% silicon.

8. An integral, extruded conductor rail having at 20° C. an average longitudinal electrical conductivity of at least 50% IACS and comprising an aluminum alloy tread portion intimately bonded to an adjoining portion, said tread portion being more abrasion-resistant than, though having a lower electrical conductivity than, said adjoining portion.

9. An integral, extruded conductor rail comprising an aluminum alloy tread portion intimately bonded to an aluminous metal adjoining portion, said tread portion being more abrasion-resistant than, though having a lower electrical conductivity than, said adjoining portion.

10. An integral, extruded conductor rail comprising an aluminum alloy tread portion intimately bonded to an adjoining portion, said tread portion having silicon as its primary alloying constituent and being more abrasion-resistant than, though having a lower electrical conductivity than, said adjoining portion.

11. The article according to claim 10, wherein said adjoining portion is an aluminous metal.

12. An integral, extruded conductor rail comprising an aluminum alloy tread portion intimately bonded to an adjoining portion by simultaneous extrusion therewith, said tread portion being more abrasion-resistant than, though having a lower electrical conductivity than, said adjoining portion.

References Cited

UNITED STATES PATENTS

| | | | |
|---|---|---|---|
| 3,094,415 | 6/1963 | Gallatin et al. | |
| 3,133,796 | 5/1964 | Craig | 29—197.5 |
| 3,222,414 | 12/1965 | Dehn | 191—22 |

ARTHUR L. LA POINT, *Primary Examiner.*

R. A. BERTSCH, *Assistant Examiner.*